United States Patent [19]

Isobe

[11] Patent Number: 5,341,202

[45] Date of Patent: Aug. 23, 1994

[54] ELECTROPHOTOGRAPHIC RECORDING APPARATUS WITH A SCANNER FOR AUTOMATICALLY SELECTING MEDIA

[75] Inventor: Minoru Isobe, Tokyo, Japan

[73] Assignee: OKI Electric Industry Co., Ltd., Tokyo, Japan

[21] Appl. No.: 894,562

[22] Filed: Jun. 5, 1992

[30] Foreign Application Priority Data

Jun. 19, 1991 [JP] Japan ................... 3-147581
Sep. 5, 1991 [JP] Japan ................... 3-226030
Sep. 12, 1991 [JP] Japan ................... 3-233051

[51] Int. Cl.$^5$ ........................................... G03G 21/00
[52] U.S. Cl. ..................... 355/308; 346/160; 355/202; 355/208; 355/233
[58] Field of Search ............... 355/308, 309, 311, 321, 355/208, 209, 228, 229, 233, 202; 346/160, 107 R, 78; 358/286, 300; 271/3, 8.1, 9

[56] References Cited

U.S. PATENT DOCUMENTS

| | | | |
|---|---|---|---|
| 4,196,898 | 4/1980 | Misawa et al. | 271/9 |
| 4,424,524 | 1/1984 | Daniele | 346/160 |
| 4,707,715 | 11/1987 | Miura | 346/160 |
| 4,814,798 | 3/1989 | Fukae et al. | 346/160 |
| 4,896,168 | 1/1990 | Newman et al. | 346/107 R |
| 4,920,421 | 4/1990 | Stemmle | 358/296 |
| 5,065,181 | 11/1991 | Ito | 355/202 |
| 5,162,916 | 11/1992 | Stemmle et al. | 358/296 |
| 5,267,056 | 11/1993 | Stemmle | 358/472 |

FOREIGN PATENT DOCUMENTS

| | | |
|---|---|---|
| 0098745 | 1/1984 | European Pat. Off. |
| 2589021 | 4/1987 | France . |
| 2665811 | 2/1992 | France . |
| 56-147164 | 11/1981 | Japan . |
| 58-111474 | 7/1983 | Japan . |
| 59-12668 | 1/1984 | Japan . |
| 59-12669 | 1/1984 | Japan . |
| 63-4766 | 1/1988 | Japan . |
| 63-171062 | 7/1988 | Japan . |
| 64-32569 | 2/1989 | Japan . |
| 1-105970 | 4/1989 | Japan . |

OTHER PUBLICATIONS

Xerox Disclosure Journal, vol. 123, No. 3, May/Jun. 1988 pp. 171–173, "Solid State Electronic Image Input-/Output Scanner", Craig S. Sellers.

IBM Technical Disclosure Bulletin, vol. 25, No. 11B, Apr., 1983, pp. 6195–6196, "Integrated Three-Terminal LED/Photodetector", H. Matino.

Primary Examiner—Leo P. Picard
Assistant Examiner—Christopher Horgan
Attorney, Agent, or Firm—Spencer, Frank & Schneider

[57] ABSTRACT

An electrophotographic recording apparatus containing a scanner is provided with a common medium receptacle unit adapted to insert media such as an original document and a print sheet, and/or a cassette for accommodating media, and a separator mechanism adapted for separating the media depending on whether they are to be fed between a light emitting/intercepting head and a photoconductor or between a transfer assembly and the photoconductor. The media may be selectively fed between the light emitting/intercepting head and the photoconductor or between the transfer assembly and the photoconductor in accordance with whether originals or printing sheets to be read.

26 Claims, 13 Drawing Sheets

ELECTROPHOTOGRAPHIC RECORDING APPARATUS WITH A SCANNER FOR AUTOMATICALLY SELECTING MEDIA

BACKGROUND OF THE INVENTION

1. Field of the Invention

The present invention relates to an electrophotographic recording apparatus with a scanner, and more particularly to such an apparatus provided with an array of light emitting devices for performing optical writing on a photoconductor, a sensor device for reading an original document sheet and a light source for illuminating the original document sheet.

2. Description of the Prior Art

A conventional electrophotographic recording apparatus with a scanner is as disclosed in Japanese Patent Application Laid-Open Nos. 147164/1981 and 105970/1989, for example, so arranged that light beams emitted from a semiconductor laser are deflected by a polygon mirror to scan an original document with the beams, and part of the light beams reflected from the original by the scanning is converged onto an image sensor. However, the conventional apparatus mentioned above has such a disadvantage that there is a need to provide an elongated optical path in order to cause the polygonal mirror to deflect the light beams emitted from the semiconductor laser to scan the original.

There is also a type of electrophotographic recording apparatus with a scanner, in which an array of light emitting devices for performing optical writing on a photoconductor and a read sensor for reading an original are arranged in a single, united body. That type of recording apparatus has such advantages that the optical path length is shorter than the earlier mentioned type of recording apparatus with a scanner using a semiconductor laser, so that there is no need to prepare an expensive optical mechanism, and it is possible to miniaturize the apparatus. Thus, hitherto, there have been proposed various schemes.

For instance, in Japanese Patent Application Laid-Open No. 12669/1984, there is proposed an apparatus having a head device in which a combination of an array of LEDs (Light Emitting Diodes) with Selfoc Lenses (registered trademark of Nippon Sheet Glass Co., Ltd.) is arranged in a unitary body for use in writing, reading and illuminating an original on a common basis. In this apparatus, the head device is rotated toward a photoconductor side with the LED array radiated for writing, or an original side with the LED array radiated for reading while illuminating the original.

Further, in Japanese Patent Application Laid Open No. 4766/1988, there is proposed an apparatus having a head device in which an LED array used both for writing and illuminating an original, a sensor for use in reading the original and Selfoc Lenses are arranged in one united body. In that type of apparatus, the LED array is radiated for writing, or the head device is movable with the LED array radiated for reading while illuminating the original.

Furthermore, Japanese Patent Application Laid-Open No. 32569/1989, there is proposed an apparatus having a head device in which an LED array for use in writing and illuminating an original on a common basis, a sensor for use in reading of the original and Selfoc Lenses are arranged in one united body. In the apparatus, the LED array is radiated for writing, or alternatively for reading while illuminating the original which is transferred between the head device and the photoconductor.

This sort of electrophotographic recording apparatus is not, however, equipped with a scanner, and thus it is necessary to separately provide a scanner device, thereby requiring an increased space in which the apparatus is installed as a telecommunications terminal. Further, that type of conventional apparatus has such a disadvantage that, although the scanner and the electrophotographic recording apparatus include elements which could be used on a common basis, both of them are provided with those elements separately.

More in detail, according to Japanese Patent Application Laid-Open No. 4766/1988, the head device is adapted to be movable to read the original, and thus it contains necessarily a mechanism for movement of the head, and therefore requires much space in which the head is enabled to move. Thus, there still remains such a difficulty that the apparatus cannot be sufficiently miniaturized.

Further, according to Japanese Patent Application Laid-Open No. 12669/1984, it is necessary to provide a mechanism for enabling the head device to rotate on a larger scale, and the apparatus is so arranged that the head device is disposed on the side of a photoconductor, over which an original document sheet is transferred. This results in a difficulty in arranging other elements such as a developer assembly and a transfer assembly along the peripheral surface of the photoconductor, and it would be necessary to provide a photoconductive drum with an enlarged diameter. This would hinder miniaturization of the apparatus.

According to Japanese Patent Application Laid-Open No. 32569/1989, the apparatus is so arranged that the head device is fixed, between which and a photoconductor an original document is transferred. It is thus free from the drawbacks mentioned above concerning Japanese Patent Application Laid-Open No. 12669/1984. There is however such a disadvantage that where an original document sheet has a shorter width perpendicular to the direction in which it runs for reading, illumination light from the LED array leaks from the spaces on the right and left sides of the original sheet to illuminate part of the photoconductor, thereby deteriorating that part of the photoconductor.

In addition, according to the prior art discussed above, separate receptacle trays are provided for receiving recording sheets and original documents. Thus, there is such a disadvantage that such medium receptacle units have to be individually provided.

Moreover, the conventional printing apparatus containing a scanner, as taught in Japanese Patent Application Laid-Open No. 171062/1988, is so arranged that when an image is to be read from an original, the original is required to be set in the paper feed tray, whereas when an image is to be recorded on a printing sheet, a printing sheet is required to be accommodated in the same paper feed tray.

According to that type of conventional printing apparatus containing a scanner, although it is possible to feed an original and a printing sheet from a single paper feed tray, the apparatus cannot discriminate whether the medium to be fed is an originator a printing sheet. Consequently, it is possible that printing is erroneously performed on an original document sheet which should have been stacked in the paper feed tray for the purpose of image reading. Further, if original document sheets are piled up on a pile of printing sheets already set in the paper feed tray with a continuous reading mode designated, the apparatus operates to read the original documents, and continue to read a vacant image of the printing sheets fed successively. Therefore, this sort of printing apparatus has a disadvantage such that it performs such a useless operation that a blank image of the printing sheets of paper are read.

SUMMARY OF THE INVENTION

I t is therefore an object of the present invention to provide an improved electrophotographic recording apparatus with a scanner free from the foregoing problems.

It is another object of the present invention to provide an improved printing apparatus capable avoiding such a useless operation that printing is erroneously performed on an original document sheet, or a blank image of a print sheet of paper is read, even if an original document and a printing sheet are accommodated in a single paper feed unit.

In accordance with a preferred embodiment of the present invention, there is disclosed an electrophotographic recording apparatus which comprises an array of light emitting devices for emitting an exposure light to expose a photoconductor with the exposure light to form a latent image thereon, a developer assembly for developing the latent image to a toner image, a transfer assembly for transferring the toner image to a recording sheet, a fuser assembly for fixing the toner image transferred on the recording sheet, a light emitting/intercepting head having a single unitary body supporting an array of photosensitive devices which is arranged adjacent to said array of light emitting devices to receive part of the exposure light, and an original feed mechanism for feeding an original document sheet to a first path formed between said light emitting/intercepting head and said photoconductor, said array of photosensitive devices being adapted to receive part of the exposure light reflected from the original document sheet conducted to the first path to read an image carried on the original document sheet.

In accordance with another embodiment of the invention, there is disclosed an electrophotographic recording apparatus comprising an array of light emitting devices adapted to be operative in response to an imagewise signal for emitting light to optically write an image represented by the signal on a photoconductor, read means for reading an original document sheet, a light source for illuminating the original document sheet, a light emitting/intercepting head comprising an array of photosensitive devices which is arranged as said read means adjacently to said array of light emitting devices for receiving light reflected from the original document sheet, a converging lens for converging the light emitted from said array of light emitting devices and light to be incident upon said array of photosensitive devices, and an original transfer mechanism for feeding the original document sheet to a path formed between said converging lens and said photoconductor.

In accordance with still another embodiment of the invention, there is disclosed an electrophotographic recording apparatus comprising an array of light emitting devices adapted to be operative in response to an imagewise signal for emitting light to optically write an image represented by the signal on a photoconductor, a transfer assembly for transferring the image written on said photoconductor to a recording sheet, read means for reading an original document sheet, a light source for illuminating the original document sheet, a light emitting/intercepting head comprising an array of photosensitive devices which is arranged as said read means adjacently to said array of light emitting devices for receiving light reflected from the original document sheet, a common medium supply unit for supplying media such as an original document sheet and a recording sheet, and a separator mechanism for separating the media with respect to whether the media are fed to a first path formed between said light emitting/intercepting head and said photoconductor or a second path formed between said transfer assembly and said photoconductor.

In accordance with still another embodiment of the invention, there is disclosed an electrophotograhic recording apparatus comprising: an array of light emitting devices adapted to be operative in response to an imagewise signal for emitting light to optically write an image represented by the signal on a photoconductor; a light source for emitting an illumination light onto an original document sheet: sensor devices for sensing part of the illumination light reflected from the original document sheet to read the original document sheet: an original transfer mechanism for feeding the original document sheet to a path formed between said array of light emitting devices and sensor devices and said photoconductor; and an optical strutter disposed between said light source and said photoconductor for preventing the illumination light from irradiating said photoconductor while the original document sheet is fed to the path.

In accordance with still another embodiment of the invention, there is disclosed a printing apparatus comprising: a scanner unit for reading an original document sheet; a printer unit for printing a print sheet; hopper means for accommodating the original document sheet and the print sheet; and determining means for determining whether a medium sent from said hopper means is an original document sheet a print sheet.

In accordance with still another embodiment of the invention, there is disclosed a printing apparatus comprising: a scanner unit for reading an original document sheet; a printer unit for printing on a print sheet; a hopper section for accommodating therein media such as the original document sheet and the print sheet; first identification means comprising a separator provided on said hopper section, and a medium detector for detecting whether or not the medium is on said separator; second identification means comprising a sent-out quantity detector for detecting a first number of media sent out from said hopper section, input means for entering a second number of original document sheets or print sheets to be sent out, and comparison means for comparing the first and second numbers; and identification signal comparison means for comparing a signal from said first identification means with a signal from said second identification means to produce an indication of alarm in response to results from comparison.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
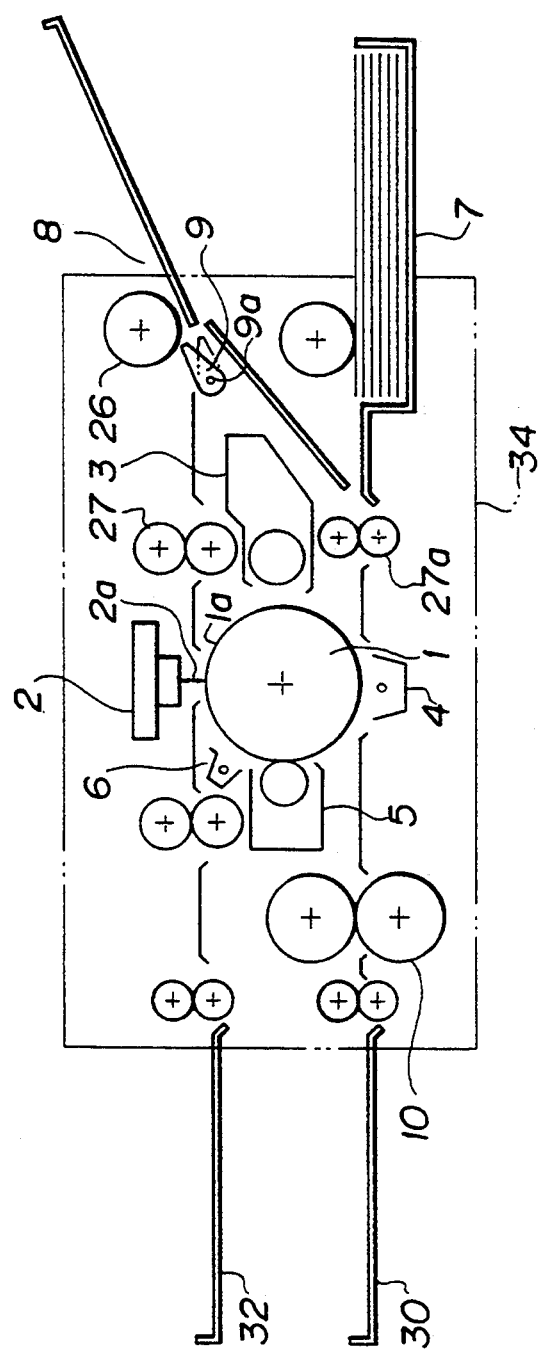
FIG. 1 is a schematical, sectional view of an electrophotographic recording apparatus with a scanner according to a preferred illustrative embodiment of the present invention.
Figure 3:
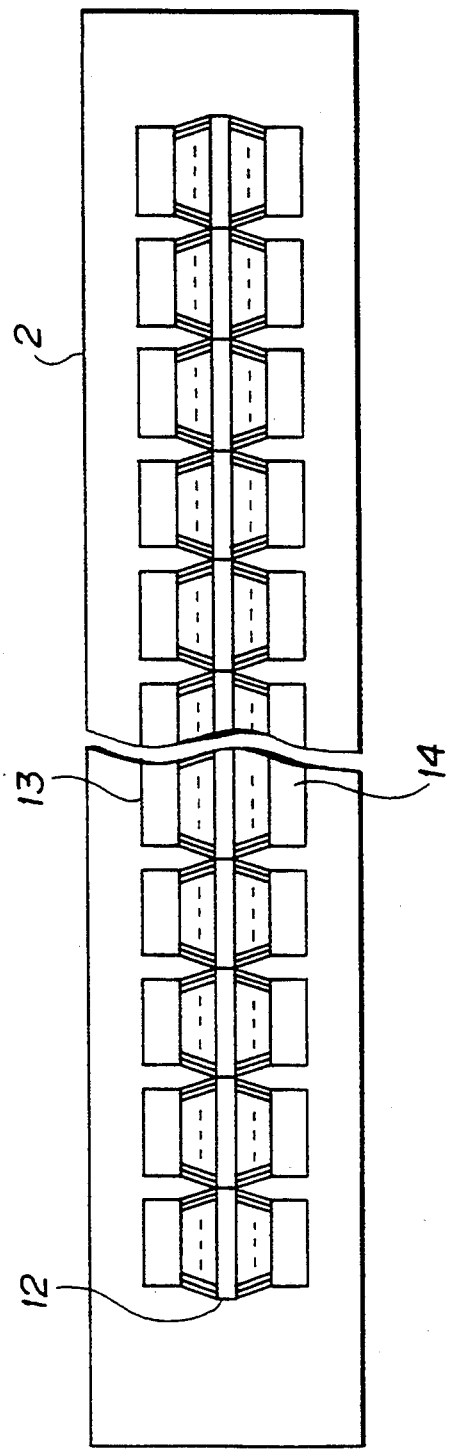
FIG. 3 is a top plan view showing a structure of a light emitting/intercepting head by way of example.

Referring to FIG. 1, an electrophotographic recording apparatus equipped with a scanner according to a preferred illustrative embodiment of the present invention basically contains a photosensitive drum 1, and a light emitting/intercepting head 2 in which an array of light emitting devices such as LEDs for emitting light and an array of photosensitive devices or sensors such as photosensitive diodes, generally designated by a reference numeral 12 in FIG. 3, are arranged in a single unitary body. The array of photosensitive devices is adapted to receive part of light emitted from the array of light emitting devices and reflected on a medium such as an original document sheet described later.

The apparatus further comprises a developer assembly 3, a transfer corona charger assembly 4, a cleaner assembly 5, a primary corona charger assembly 6, a sheet cassette 7, a medium feed source or medium receiving unit such as receptacle tray 8 adapted for receiving a medium such as an original document sheet or a recording sheet manually provided, and a fuser 10. The apparatus further includes a lead-in roller 26 for leading recording or original sheets inserted from the medium receptacle tray 8 in the apparatus.

The apparatus is provided with a separator mechanism 9 for separating a medium in such a manner that an original inserted from the medium supply unit or feed source tray 8 is guided to a path formed between the light emitting/intercepting head 2 and the photosensitive drum 1 while a recording or print sheet inserted from the medium receptacle tray 8 is guided to another path formed between the transfer corona charger assembly 4 and the photosensitive drum 1. In this embodiment, the separator mechanism 9 includes a blade of which one edge is pivotably supported by a rod 9a, as seen in FIG. 1, to conduct a medium from the tray 8 to rolls 27a while taking a position shown by a so id line, and to rolls 27 while taking a position shown by a dotted line in the figure.

Next, the above-mentioned illustrative embodiment will be described as to a case where the apparatus is operative as a printer. First, the array of light emitting devices of the light emitting/intercepting head 2 is driven to be luminous in response to imagewise signals representative of an image such as characters and figures so that a corresponding electrostatic latent image is written into the photosensitive surface of the drum 1. The developer assembly 3 is operative to deposit a toner to portions of the photosensitive drum 1 corresponding to the electrostatic latent image formed thereon. The transfer corona assembly 4 serves to transfer the toner deposited on the photoconductive surface to the recording sheet. The fuser 10 serves to fix the toner transferred to the recording sheet by means of pressing and heating. After fixing, the recorded sheet is delivered out to a discharge tray 30 of the casing 34. The residual toner remaining on the surface of the photosensitive drum 1 after the transfer is cleaned by the cleaner assembly 5, and thereafter the surface of the photosensitive drum 1 is uniformly charged by the primary corona assembly 6 to provide for the succeeding exposure.

Now, it is noted that the recording sheets may be continuously fed from the sheet cassette 7, and also be manually inserted one by one from the medium receptacle tray 8. In the case of manual insertion, the separator mechanism 9 is adapted to operate manually. However, the separator mechanism may be adapted to operate automatically or in response to a signal from a host system such as a personal computer, interconnected thereto in such a manner that the recording medium is guided to the path formed between the transfer corona assembly 4 and the photosensitive drum 1. The lead-in roller 26 serves to lead the recording sheet inserted or fed from the medium receptacle tray 8 in the apparatus and send the same to paper feed rollers 27a provided lower in the apparatus.

Next, the above-mentioned illustrative embodiment will be described for a case where the apparatus is operative as a scanner. First, an original document sheet is inserted from the medium receptacle tray 8, and the separation mechanism 9 is operated manually, automatically, or in response to a signal from the host system so that the original sheet is guided into the path formed between the light emitting/intercepting head 2 and the photosensitive drum 1. Then, the light emitting device array of the light emitting/intercepting head 2 is activated to be luminous to illuminate the original with light 2a, so that light reflected from the original is intercepted by the photosensitive device or sensor array of the light emitting/intercepting head 2. Upon receipt of the reflected light, the photosensitive device array will convert an optical image carried on the original document sheet into a corresponding electric signal and output the electric signal to the host system. The original sheet of document will be discharged to another tray 32, which is provided on a side of the housing 34.

Thus, the apparatus according to the illustrative embodiment of the invention operates as a scanner as well as a printer.

Figure 2:
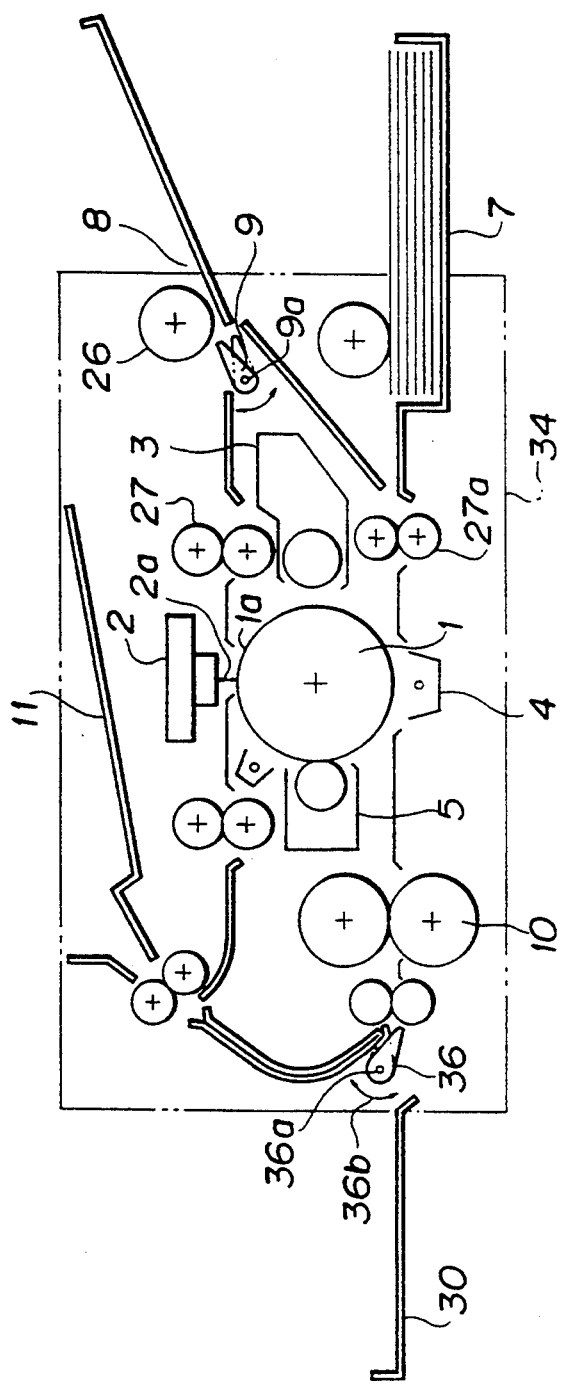
FIG. 2 is also a schematical, sectional view of an electrophotographic recording apparatus with a scanner according to another illustrative embodiment of the invention.

Now, referring to FIG. 2, an electrophotographic recording apparatus provided with a scanner according to another illustrative embodiment of the invention is the same as the apparatus shown and described with reference to FIG. 1 except that the former is provided with an upper tray 11 which is adapted to receive a medium discharged after being recorded or read, and therefore has an advantage such that one can easily take out the medium, after being recorded or read, from the front of the apparatus. The tray in to which a finished medium is received is selectable between trays 30 and 11 by another separator 36 provided in the path, along which the finished medium is transferred. In this embodiment, the separator 36 includes, like the separator 9, a blade having one edge pivotably supported by a rod 36a, as shown by the arrow 36b in the figure, to conduct a medium from the rolls 10 to tray 11 while taking a position shown by a solid line, and to the tray 30 while taking a position shown by a dotted line in the figure. In the figure, like components are designated with the same reference numerals as those of the embodiment shown in FIG. 1, and redundant description will be avoided for simplicity.

While both of the illustrative embodiments described above are provided with the sheet cassette 7 and the medium supply unit or receptacle tray 8, the present invention is effectively applicable to an apparatus without the sheet cassette 7. Further, the medium receptacle tray 8 may be adapted to have the same structure as the sheet cassette 7.

Figure 4:
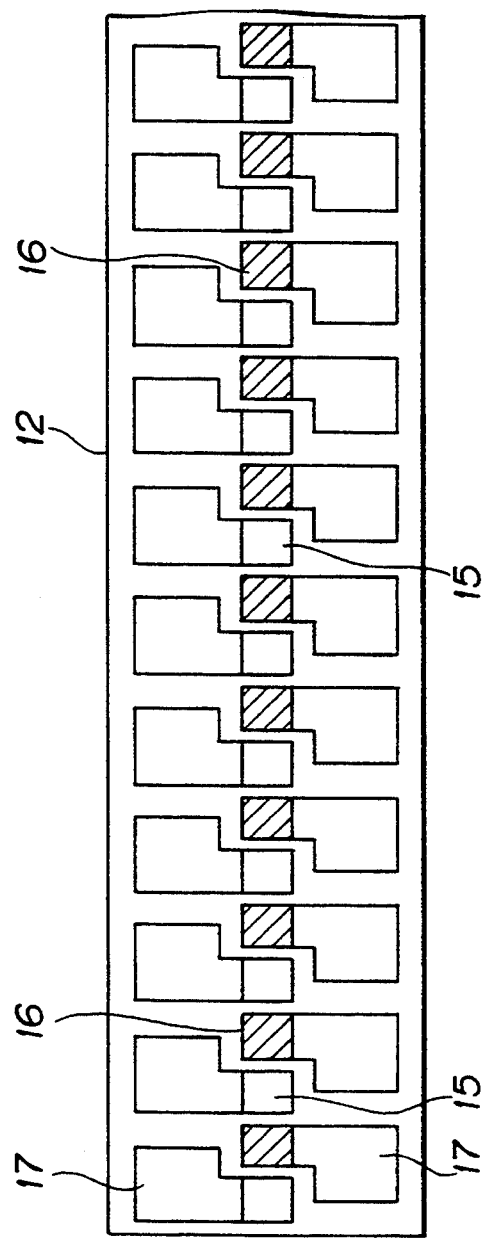
FIG. 4 is a top plan view showing a structure of an array of light emitting devices and photosensitive devices by way of example.

Referring to FIG. 3, an example of the light emitting-/intercepting head 2 includes the array of light emitting/intercepting devices 12 which includes light emitting diodes 15 and photosensitive diodes 16. FIG. 4, arranged alternately with each other as shown in FIG. 4, a light emitting device driver 13 for driving a plurality of light emitting diodes 15, and a read circuit 14 for receiving outputs from the plurality of photosensitive diodes 16.

The array of light emitting/intercepting devices 12 is formed into a chip usually having a length of 2 to 5 inches, and thus when designing a recording apparatus, a desired number of the chips may be connected to establish a reading length required for sensing an image of an original document sheet in its traverse direction. For example, the array of light emitting/intercepting devices 12 is designed to sense a B4 size original document fed in its longitudinal direction, 32 chips of the array 12 are linearly arranged, each of which includes 64 light emitting diodes 15 disposed alternately with 64 photosensitive diodes 16 with pitch of 16 pieces per millimeter. This sufficiently establishes an image sensing resolution of 8 lines per millimeter suitable for an ordinary use.

According to the arrangement described above, the light emitting devices 15 and the photosensitive devices 16 are formed in a single line, and thus the head 2 can be shorter in the peripheral direction of the photosensitive drum 1 thereby contributing to miniaturizing the apparatus.

Referring to FIG. 4, light emitting diodes 15 are spaced alternately with photosensitive diodes 16, diodes 16 being shown with hatching in order to be distinguished from diodes 15. There is formed an electrode 17 on each of diodes 15 and 16 by deposition of electrically conductive material such as aluminium or the like. Since the light emitting diodes 15 and the photosensitive diodes 16 are closely disposed to each other, there would be such a possibility that light emanating from a light emitting diode 15 gets directly into photosensitive diode 16, depending upon the directivity thereof. This difficulty can however be avoided by forming a shielding projection between each light emitting diode 15 and the photosensitive diode 16 adjacent thereto.

Figure 5:
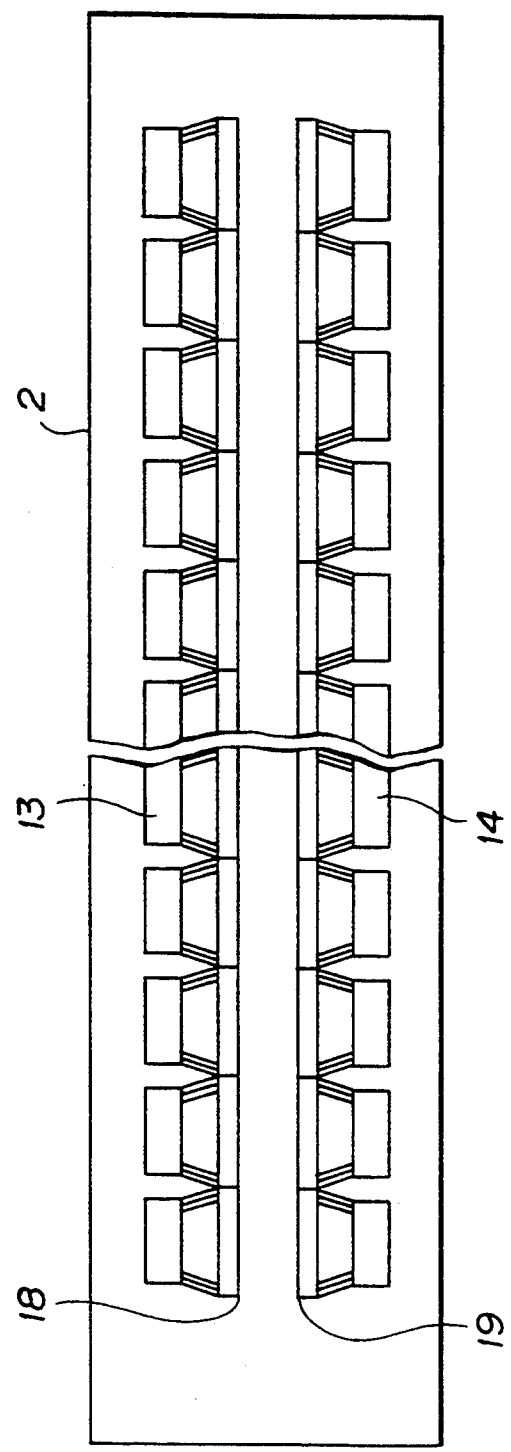
FIG. 5 is a top plan view exemplarily showing another structure of a light emitting/intercepting head.

Referring to FIG. 5, which is similar to FIG. 3, an array of light emitting devices 18 and an array of photosensitive devices 19 are implemented on separate chips. A plurality of light emitting device arrays 18 is formed in one line, and a plurality of photo sensitive device arrays 19 in another line. According to this arrangement, since the light emitting device array 18 and photosensitive device array 19 may be fabricated separately into the respective chips, it is possible to select respective substrate materials which are optimum for each chip, and thus the fabrication of the chips is facilitated. However, since each of the light emitting/intercepting arrays 18 and 19 is connected with associated driver electronics at one end thereof only, as shown in the figure, a high packing density of wiring connections would be likely to invite short-circuits therebetween.

Figure 6:
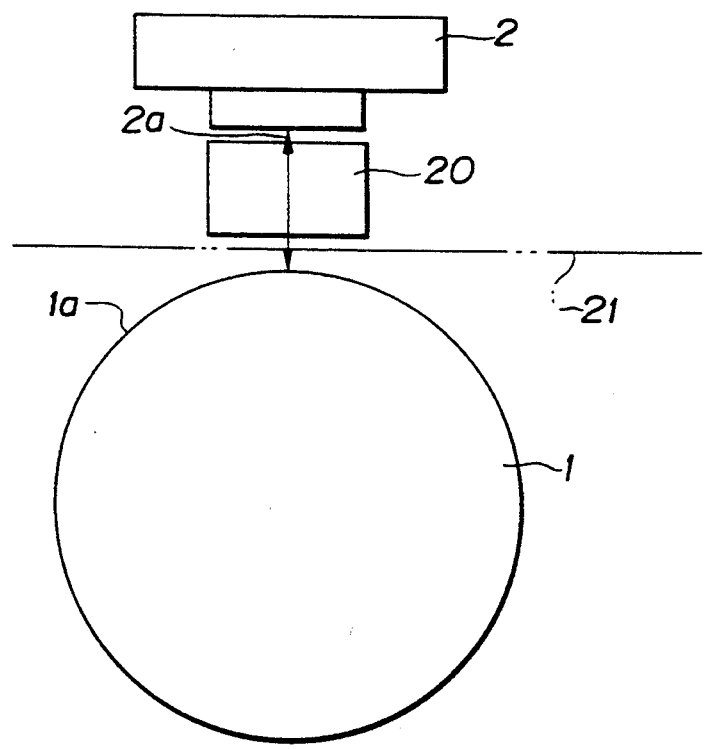
FIG. 6 is a side elevation of a structure in which a rod lens array is mounted on the light emitting/intercepting bead.

Referring to FIG. 6, an array of rod lenses 20 is mounted in front of the light emitting/intercepting head 2. When the apparatus equipped with the rod lens array 20 operates as a printer, light emitted from the light emitting devices of the light emitting/intercepting head 2 is focused by the rod lens array 20 onto the photosensitive drum 1. When the apparatus operates as a scanner, part of light emitted from the light emitting devices of the light emitting/intercepting head 2 is reflected on an original 21, and returned through the rod lens array 20 to the light emitting/intercepting head 2 to be received by the photosensitive devices. It is therefore possible to use the relatively expensive rod lens array, on a common basis for both the printer and the scanner. The light emitting devices of the light emitting/intercepting head 2 may be used for writing in the printer function, and in addition as a light source for illuminating the sheet of original document 21.

According to the structure shown in FIG. 6, when the apparatus operates as a printer, the focal points of the rod lens array 20 will be focused on a portion of the photosensitive surface 1a of the photosensitive drum 1 just below the rod lens array 20. When the apparatus operates as a scanner, the apparatus controls the head control mechanism to move the head 2 so that the focal points of the rod lens array 20 are shifted onto the original sheet 21 from which light is reflected.

Now it should be noted that another type of light source such as a fluorescent lamp may be used for illuminating an original. Further, according to the structure shown in FIG. 5, the apparatus may be designed with the increased spacing between the light emitting device array 18 and the photosensitive device array 19, resulting in the possible use of discrete optical lenses.

Figure 7:
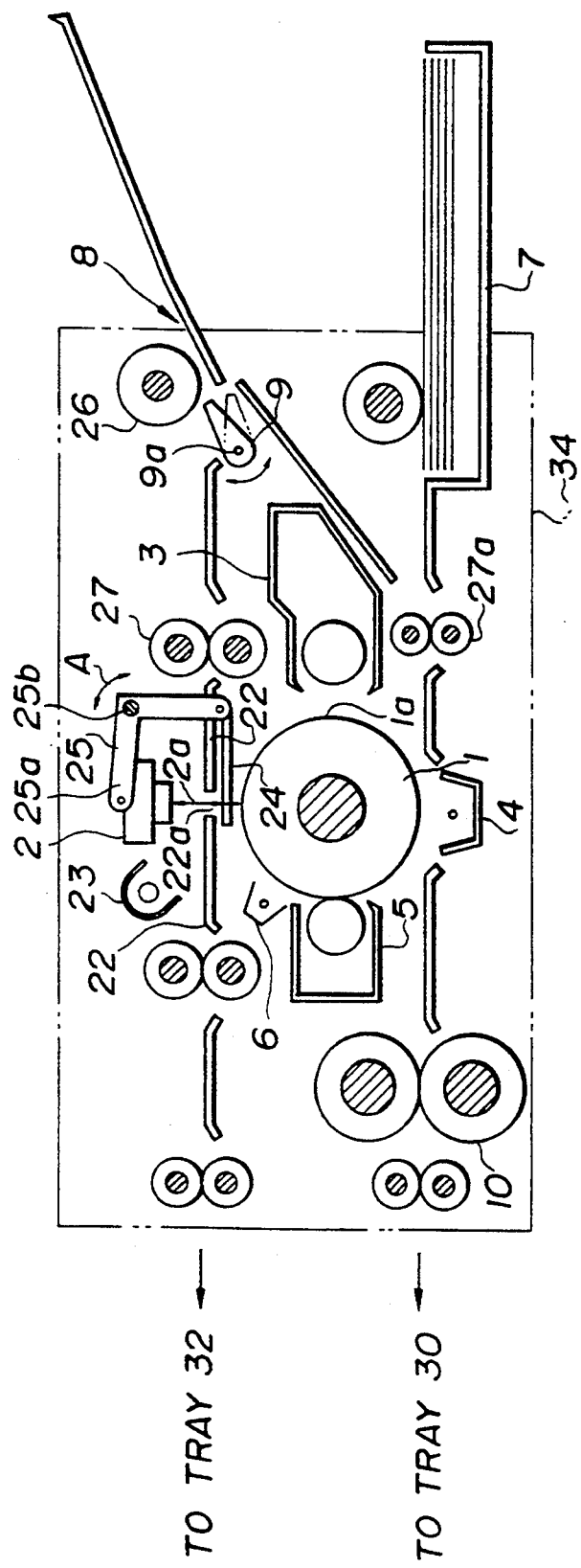
FIG. 7 is a sectional view, similar to FIG. 1, of an electrophotographic recording apparatus with a scanner according to still another illustrative embodiment of the invention.

Referring to FIG. 7, an electrophotographic recording apparatus with a scanner according to still another illustrative embodiment of the invention comprises a guide plate 22 disposed between the photosensitive drum 1 and the light emitting/intercepting head 2 for guiding an original document sheet. The guide plate 22 has a slit 22a cut out at the central portion thereof, through which slit light for writing 2a emanating from the light emitting device array 12 of the head 2 can impinge on the surface of the photoconductor drum 1. In the figures, like components are denoted by the same reference numerals as those of the embodiments shown in FIGS. 1 and 2.

The apparatus is also provided with a light source 23 such as a fluorescent lamp, disposed separately from the head 2, for illuminating a sheet of an original document guided on the guide plate 22. The light source 23 has a sufficient length so that it uniformly illuminates the entire lateral length of the original in a direction substantially perpendicular to the direction in which the original sheet is fed. An optical shutter 24 is also provided for blocking the luminous light 2a from impinging on the photosensitive drum 1 from the light source 23 during the original reading mode.

In addition, the apparatus includes a driving mechanism 25 which is operative to drive the shutter 24 and the light emitting/intercepting head 2 in such a manner that, when an original sheet is to be read, the shutter 24 is brought to close the opening 22a and the head 2 is brought away from the photosensitive drum 1 in the direction substantially perpendicular to the peripheral surface 1a of the drum 1 to focus on the orginal sheet carried by the guide plate 22, and otherwise the shutter 24 opens the slit 22a and head 2 approaches the drum 1. For this purpose, the drive mechanism 25 includes an L-shaped link 25a for supporting the head assembly 2 on a tip of one arm thereof and the shutter 24 on a tip of the other arm thereof. The link 25a is pivotably supported by a fixed rod 25b about which it pivots as shown by an arrow A.

Next, the illustrative embodiment shown in FIG. 7 will be described for the case in which the apparatus is operative as a printer. First, in the printer mode of operation, the light emitting/intercepting head 2 is controlled to be in the position in which it approaches the guide plate 22 to focus the light 2a emanating from the head 2 on the photosensitive surface 1a of the drum 1, and the optical shutter 24 is retracted to open the slit 22a. Under those situations, the light emitting device array of the light emitting/intercepting head 2 is driven in response to imagewise signals to record a corresponding, electrostatic latent image on the photosensitive surface 1a of the drum 1. Other exposure, transfer, fixing and cleaning processes are the same as those described with reference to FIGS. 1 and 2.

With the instant embodiment also, recording sheets may be continuously fed from the sheet cassette 7, and also be manually inserted one by one from the medium receptacle tray 8, as described earlier with reference to FIGS. 1 and 2.

In the scanner mode operation, a sheet of an original document is inserted or provided from the medium receptacle tray 8, and the separation mechanism 9 is operated manually, automatically, or in response to a control signal, and the lead-in roller 26 is operated to lead the original from the tray 8 in the apparatus and send the same to a paper feed rollers 27 provided in the upper part of the apparatus, so that the original sheet is guided onto guide plate 22 to the path between the light emitting/intercepting head 2 and the photosensitive drum 1. In parallel with this operation, preferably, the driving mechanism 25 drives the shutter 24 to close the slit 22a in cooperation with the separator mechanism 9. This linkage brings the light emitting/intercepting head 2 away from the photosensitive drum 1 to focus or converge the light 2a impinging on the document thus transferred over the guide plate 22. Thereafter, the light source 23 is turned on immediately before the original reaches a reading position, namely the position of the slit 22a. This movement makes it possible to prevent the photosensitive material suported on the peripheral surface 1a of the drum 1 from being deteriorated due to extra illumination with the beam which would otherwise occur, since there is no occasion in which light from the light source 23 is applied to the photosensitive drum 1 during the reading mode.

The light source 23 is turned on to illuminate the original sheet, so that light reflected from the original is received by the photosensitive device array of the light emitting/intercepting head 2. Upon receipt of the reflected light, the photosensitive device array will an optical image will convert an optical image of the original document into a corresponding electric signal and output the electric signal to an external apparatus. As may be noted, in the scanner mode, the array of light emitting devices of the head 2 is not driven for sensing the image of the original document.

Further, according to the present illustrative embodiment, it is possible to use a more powerful light source such as a fluorescent lamp, since the light source 23 for use in illumination of an original is provided separately from the head assembly 2. It is thus possible to read an original at higher speed even in the case of a read sensor having lower sensitivity included in the head 2.

Furthermore, according to the illustrative embodiment, it is possible to smoothly pass original document sheets over the guide plate 22, since the driving mechanism 25 serves, at the time of the original reading mode, to retract the light emitting/intercepting head 2 away from the photosensitive drum 1 . In addition, it is advantageous to adjust the focal point either on a surface of the original document on the guide plate 22 or on the photosensitive surface of the drum 1.

Now, it is noted that the light source 23 is not restricted to a fluorescent lamp, and may be replaced by, for example, a source in which a number of LED's are arranged on a linear basis. These LEDs may be larger in scale than LEDs for use in writing in the head 2 and adapted to emit light higher in intensity than the LEDs included in the head 2.

It is further noted that the optical shutter 24 is not restricted to a mechanical shutter, and may be replaced by, for example, a shutter in which a liquid-crystal light valve is embedded into the slit 22a which is provided so that light for writing from the head 2 can expose the photosensitive drum 1, and the passage of light is electrically controlled in the scanner mode. In this case, it is possible to simplify to a much greater extent the structure of those mechanisms and thus reduce the space required for mounting, since a drive mechanism for mechanically controlling the light valve shutter to a much greater extent.

Furthermore, it is sufficient for the head assembly 2 that the light emitting device array for performing optical writing on the photoconductor and the read device array for reading an original are arranged in one united body. For example, available is a head device in which an LED array for use writing, reading and illumination of an original on common basis and Selfoc Lenses are arranged in one united body. Another type of head device is available in which an LED array for use in writing and illumination of an original on a common basis, a sensor for use in reading of the original and Selfoc Lenses are arranged in one unitary body. Also applicable is a head assembly in which an LED array for use in writing; and illumination of an original on a common basis, a sensor for use in reading of the original and Selfoc Lenses are arranged in one united body. In a case, where the LED array is used in common for writing and reading, it is sufficient to design the head asssembly such that current flows in one direction at the time of reading and in the other direction opposite to the one direction at the time of writing, with the difference in the current direction of the irradiated LED being detected.

Figure 8:
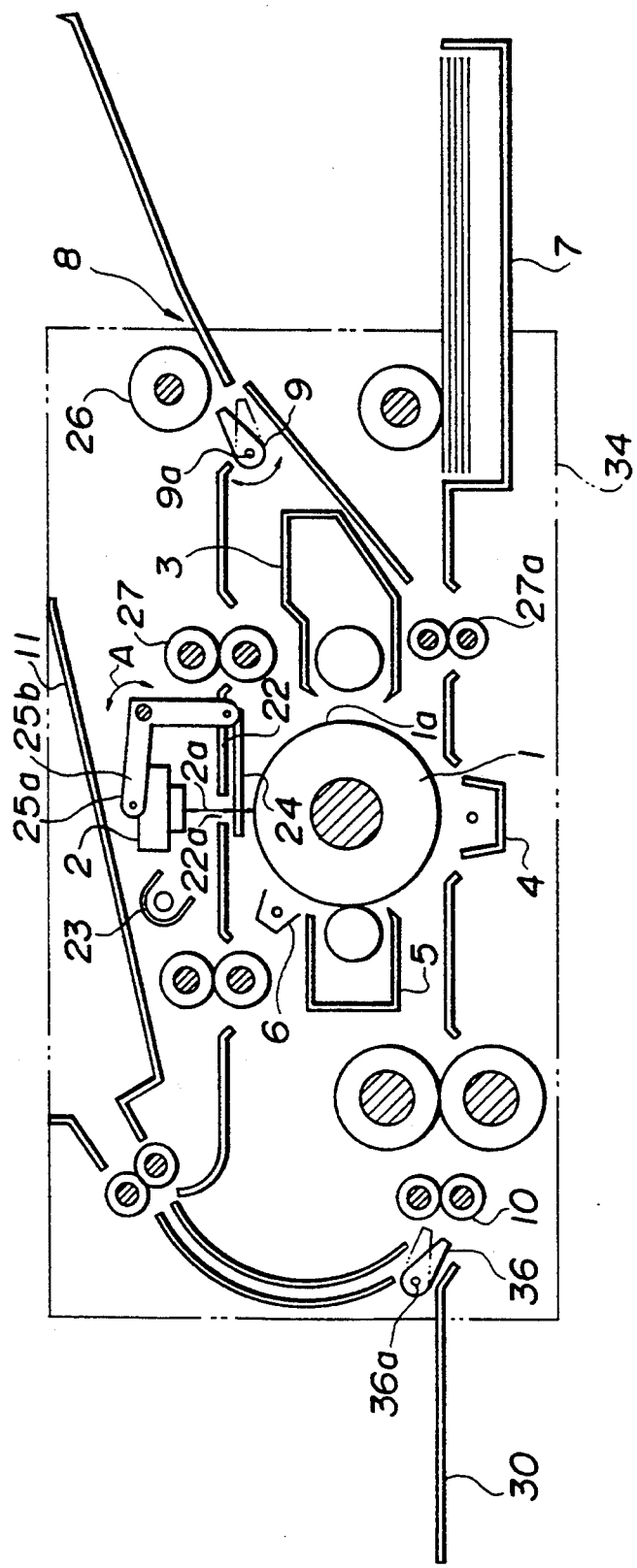
FIG. 8 is a sectional view of an electrophotographic recording apparatus with a scanner according to a still further illustrative embodiment of the invention.

Referring to FIG. 8, an electrophotographic recording apparatus with a scanner according to another illustrative embodiment of the invention is basically structured identically to the apparatus shown in FIG. 7 except that the former is so arranged that the medium can, after being recorded or read, be discharged to an upper tray 11, separately provided from the tray 30. The apparatus is advantageous in taking out the medium after being recorded or read from the front of the apparatus, as discussed with reference to FIG. 2.

Also in the illustrative embodiments shown in FIGS. 7 and 8, similar to the other illustrative embodiments described above, they may be so adapted that an array of rod lenses, such as Selfoc focusing lenses, for example, is disposed before the light emitting/intercepting head 2, so that the optical length of the optical system is shortened.

Further, it is noted that in the illustrative embodiments discussed above, as the light emitting device array there may be used a self-luminous type of device or one in which light from a light source such as a fluorescent lamp is controlled in transmissivity by a liquid crystal shutter array.

According to the present embodiment described just above, the following advantages are expected:

An electrophotographic recording apparatus with a scanner comprises a light emitting/intercepting head 2 in which a photosensitive device array is arranged adjacent to a light emitting device array in one united body, and an original feed mechanism for causing an original to pass through between the light emitting/intercepting head 2 and photoconductor 1, the light emitting device array of the light emitting/intercepting head 2 is adapted to read the original document. This structure makes it possible to contain the scanner in the electrophotographic recording apparatus, even if an electrophotographic recording apparatus having a shorter optical path length is established. It is thus possible to miniaturize the apparatus. Further there is no necessity for an installation space in which a separate scanner is installed.

Further it is possible, if a common optical lens is provided between the light emitting/intercepting head 2 and the photoconductor 1, to use the optical lens in common for the scanner and printer functions.

Furthermore, if there are provided a common medium receptacle tray adapted to insert or develop media such as original and print sheets, and a separator mechanism adapted for separating the media on the basis of whether they are to be fed between the light emitting-/intercepting head 2 and the photoconductor 1 or between the transfer assembly and the photoconductor 1, it is possible to use the medium receptacle tray or cassette commonly for the scanner and printer features.

An electrophotographic recording apparatus provided with a scanner comprises a light emitting/intercepting head 2 in which a photosensitive device array comprising sensor devices is arranged adjacent to a light emitting device array, a converging lens for converging light for writing emitted from the light emitting device array of the light emitting/intercepting head 2 and light incident upon the photosensitive device array, and an original transfer mechanism for causing an original document sheet to pass through between the focus lens and the photoconductor 1. This structure makes it possible to perform reading and writing without translating the light emitting/intercepting head, and in addition to pass both the writing light and the reading light through the same focus lens. It is therefore possible to mount the mechanism for writing and reading around the photoconductor with compactness, thereby miniaturizing the apparatus.

Further, an electrophotographic recording apparatus with a scanner comprises a light emitting/intercepting head 2 in which a photosensitive device array comprising sensor devices is arranged adjacent to a light emitting device array, a common medium receiving tray or feed source 8 adapted to insert or provide media such as original document sheets and recording or print sheets, and a separator mechanism 9 adapted for separating the media depending upon whether the media are to be fed between the light emitting/intercepting head 2 and the photoconductor 1 or between a transfer assembly and the photoconductor 1. This structure makes it possible to insert both the original sheets and the recording sheets from the common medium feed source. Thus it is also possible to contribute to miniaturization of tile apparatus as well as the use of the medium feed source unit 8 on a common basis.

Furthermore, an electrophotographic recording apparatus with a scanner comprises an original transfer mechanism for causing a sheet of original document to pass through between a light emitting/read device array 2 and a photoconductor 1, and an optical shutter 24 disposed between a light source 23 for use in illumination of original sheets and the photoconductor 1 for preventing the photoconductor 1 from being illuminated with light from the light source 23 by the photoconductor 1. This structure makes it possible to prevent the light for illuminating originals from irradiating the photoconductor 1 by closing the shutter 24 when reading, even in the apparatus where the light emitting/intercepting head 2 is not movable, thereby avoiding extra deterioration of the photoconductor 1. In addition, with the apparatus in which the head device 2 is located above the photoconductor 1, it is possible to avoid troubles caused on the photoconductor 1 by clips, staples, alien toner, powder, pieces of paper and the like inadvertently dropped thereon, which may accompany sheets of original document to be mixed into the developer assembly.

Figure 9:
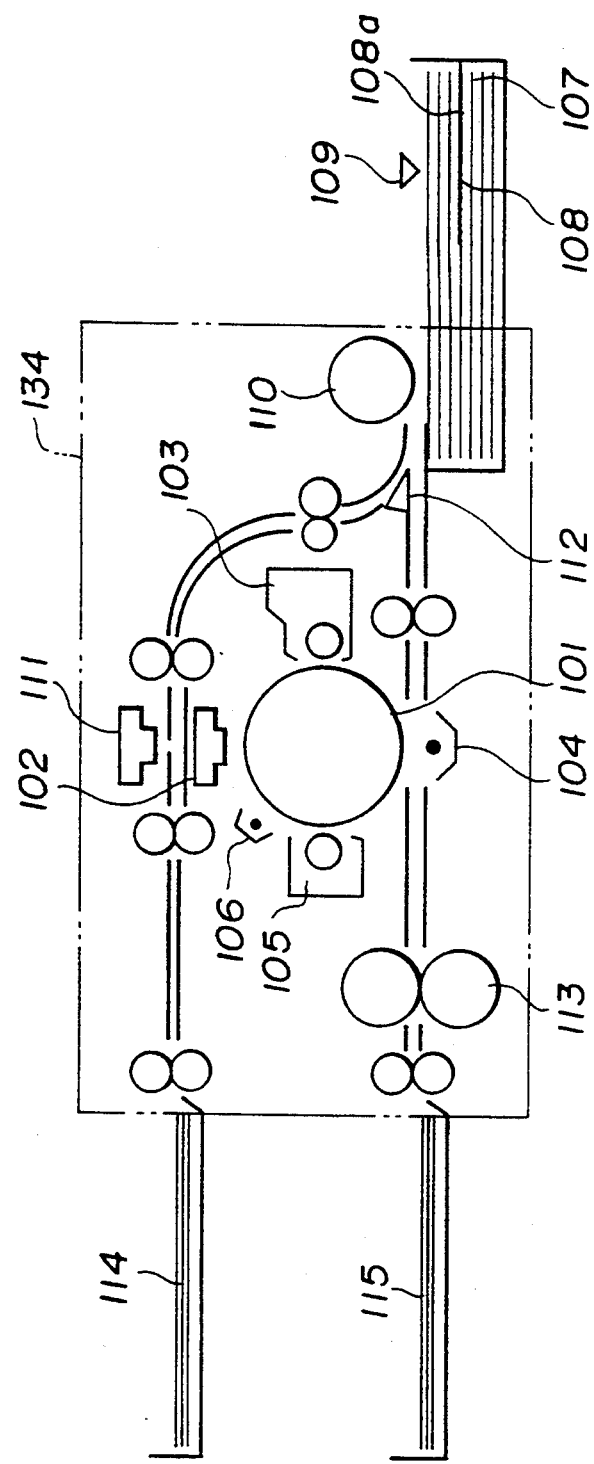
FIG. 9 is a sectional view of a printing apparatus with a scanner according to an illustrative embodiment of the invention.

Referring to FIG. 9, a printing apparatus with a scanner according to still another illustrative embodiment includes a photosensitive drum 101, and a writing head 102 in which an array of light emitting devices is enabled to be luminous in response to an imagewise signal representing characters and/or figures so that a corresponding latent image is optically written on the photosensitive surface of the photosensitive drum 101. The apparatus also includes a developer assembly 103, a transfer corona assembly 104, a cleaner assembly 105, a primary corona assembly 106, a hopper section 107, and a projecting separator 108 provided in the middle of the hopper section 107 to project cover partially sheets piled up on the hopper section 107 and form a partition adapted for dividing top and bottom piles of the sheets.

A sensor 109 is provided for sensing a direct exposure of the upper surface of the separator 108. The apparatus is also provided with a sender roller 110 for sending out one by one original or print sheets from the hopper section 107, a sensor or read head 111 containing a light source for use in illuminating an original sheet and an array of sensor devices for sensing an image carried by the original, a selector mechanism 112 for separating a medium in such a manner that an original sheet inserted from the hopper section 107 is guided downward of the read head 111, and a recording or print sheet inserted from the hopper section 107 is guided between the transfer corona assembly 104 and the photosensitive drum 101. In the instant embodiment, the selector mechanism 112 includes a pivotable blade for conducting a medium from the hopper 107 toward the sensor head 111 and toward transfer charger assembly 104.

There are also provided in the apparatus a fuser 113, an original tray 114 for receiving and stacking sheets of an original document after being read, and a print sheet tray 115 for receiving and stacking print sheets after being printed.

In the operation of printer mode, a plurality of print sheets are accommodated in the lower stage from the separator 108, and are not accommodated in the stage above the separator 108. Under this condition, if a printing mode of operation is set, the sensor 109 senses the top surface of the separator 108, since there is no sheet on the top, so that the sensor 108 sends to a control unit, not shown, within the apparatus a signal indicating the fact that the separator 108 is detected. Upon receipt of this signal, the control unit recognizes that the medium to be dealt with is a print sheet, and operates the selector mechanism 112 so as to feed the medium sent out to the transfer corona assembly 104. Next, the control unit causes the sender roller 110 to rotate so that the medium on the top, that is, a print sheet, is sent out from the hopper section 107.

The print sheet thus sent out is guided by the selector mechanism 112 toward the transfer corona assembly 104. The writing process is carried out in synchronism with the sheet feeding operation. More specifically, the light emitting device array of the writing head 102 is activated to be luminous so that an electrostatic latent image representing characters and figures, for example, is formed on the photo sensitive material of drum 101 which has been uniformly charged in advance by charger 106.

The developer assembly 103 is operative to deposit a toner to a portion corresponding to the electrostatic latent image written into the photosensitive drum 101. The transfer corona assembly 104 serves to transfer the toner to the print sheet. The fuser 113 serves to fix the toner transferred to the print sheet by means of pressing and heating. After fixing, the print sheet is delivered out of the casing 134 to be stacked on the print sheet tray 115. The residual toner on the surface of the photosensitive material of the drum 101 after the transfer is cleaned by the cleaner assembly 105, and thereafter the surface of the photosensitive drum 101 is uniformly charged by the primary corona assembly 106 to provide for the next exposure.

Thus, it is possible to continue the printing operation, until there becomes no print sheet on the hopper section 107. If it is required that an original is read in the mid course of the printing, then the printing operation is temporarily interrupted. One can set a single or a plurality of original sheets on the separator 108 of the hopper section 107. In response to the instruction that a reading mode of operation is to be employed, the sensor 109 fails to sense the top surface of the separator 108, since there are originals on the covering the separator 108, so that the detector 108 sends to the control unit of the apparatus a signal indicating that the separator 108 is not detected. Upon receipt of this signal, the control unit recognized that the medium to be provided is not a print sheet but the original, and switches the selector mechanism 112 so as to feed the medium provided as an original document toward the read or sensor head 111. Next, the control unit causes the sender roller 110 to rotate so that the medium on the top of the pile, that is, a sheet of the original document, is developed from the hopper section 107. The developed original sheet is guided by the selector mechanism 112 toward the read head 1211, and is read by the read head 111. The original sheet is, after being read by the head 111, discharged from the casing 134 to be stacked on the original tray 114.

If the reading operation is continued and there is no medium on the separator 108, then the sensor 109 senses the separator 108. In response, the control unit recognizes from the signal from the sensor 109 that a successive medium is to be handled is a print sheet and not an original sheet, and thus drives the selector mechanism 112 to allow media to be fed to the transfer corona assembly 104. Thus, the reading operation is terminated, and the printing operation will be resumed.

Thus, according to the embodiment mentioned just above, the structure for simply loading additional originals permits the apparatus to read the loaded quantity of originals, without necessity for taking out the print sheets during the printing operation. Therefore, the apparatus is convenient for an application in which the apparatus is usually utilized as a printer, but occasionally as a scanner.

The description was made on the instant embodiment in terms of the case in which original document sheets are loaded in the mid course of the printing operation. It is to be noted that the apparatus is also operative in the same way in the case where original sheets have been initially loaded.

Further, according to the embodiment described just above, original sheets are accommodated on the separator 108. However, in an application where the apparatus is more often utilized as a scanner, the apparatus may be so adapted that original and print sheets are accommodated below and on the separator 108, respectively 108. In the latter design, it is sufficient to provide such a control that, upon the sensor 109 detecting the separator 108, the medium is fed to the transfer corona assembly 104, and otherwise to the sensor head 111. Such a modification is possible with circuitry designed to switch the polarity of the output signal from the sensor 109. It will therfore be more convenient to provide a selector switch for selecting alternate states dependent upon whether an original or a print sheet is set above with respect to the separator 108.

Furthermore, in order to detect the state that there is no medium between the sensor 109 and the separator 108, it is sufficient to provide, for instance, such an arrangement that the separator 108 is of an electrically conductive type, and a V-shaped metallic piece is provided as the sensor 109 over the hopper section 107 and urged toward the separator 108. A measurement is made of the electrical conductivity between the sensor 109 and the separator 108 so that when a medium is present on the separator 108, the circuit becomes nonconductive, whereas when no medium is present, it becomes conductive. Further, it may also be discriminated whether the separator 108 is present or absent on the separator 108 in the hopper section 107 in such a manner that a reflection factor or reflectivity of part or the whole of the top surface 108a of the separator 108 is selected to be substantially higher or lower than that of a possible medium, and the sensor 109 is adapted to be optically sensitive to determine a difference in light intensity between the light reflected from the medium and from the top surface of the separator 108.

Figure 10:
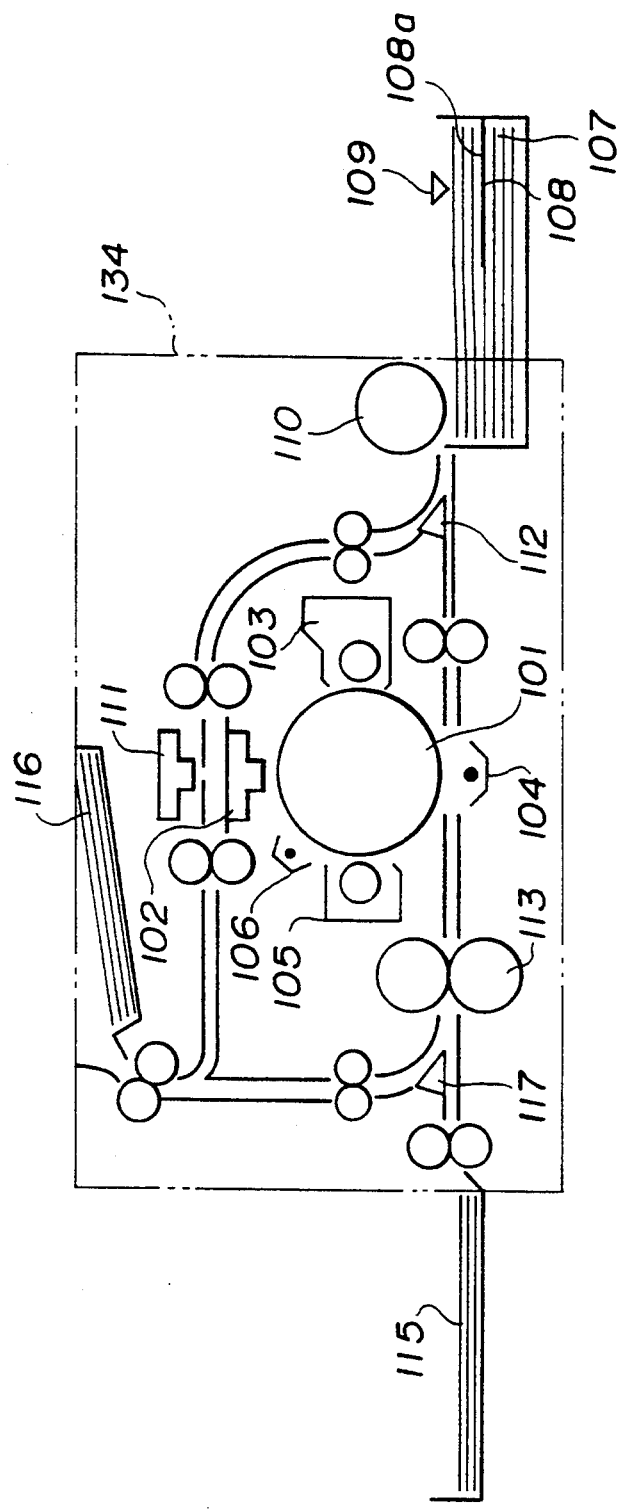
FIG. 10 is a sectional view of a printing apparatus with a scanner according to another illustrative embodiment of the invention.

Referring to FIG. 10, a printing apparatus with a scanner according to another illustrative embodiment of the invention is the same as the apparatus shown in FIG. 9 except that the FIG. 10 apparatus is so arranged that a medium after being recorded or read can be discharged to an upper tray 116. Thus there are advantages such that it is possible to take out the medium after being recorded or read from the top of the casing 134, and also the original sheets or the print sheets are stacked in the order that they are subjected to in turn for reading or printing. Reference numeral 117 denotes a selector mechanism adapted for switching the printing sheets after printed so as to transmit them to the print sheet tray 115 or the upper tray 116.

Figure 11:
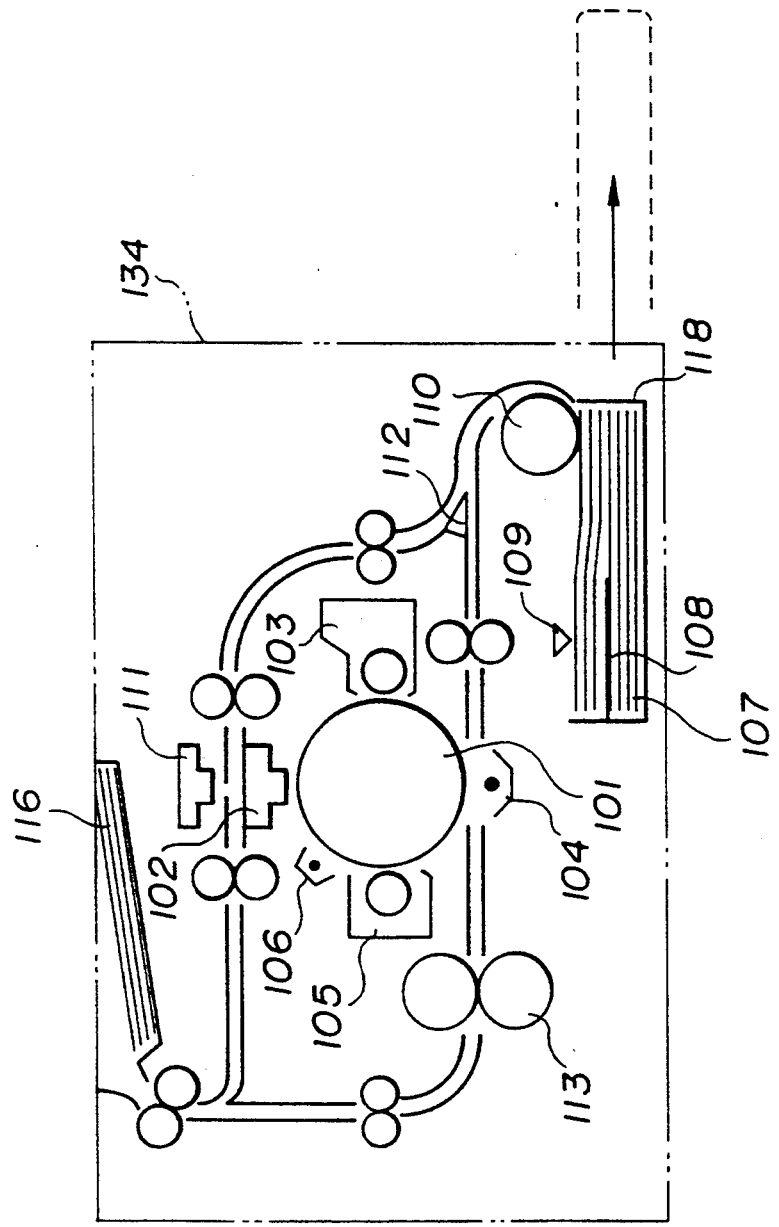
FIG. 11 is a sectional view of a printing apparatus with a scanner according to still another illustrative embodiment of the invention.

With reference to FIG. 11. a printing apparatus including a scanner according to still another illustrative embodiment is provided with the hopper 107 which comprises a cartridge 118 adapted to be drawn out from the casing 134. Both original document and print sheets are transferred onto the upper tray 116 and stacked thereon. The cartridge 118 is drawn out. When one intends to set original or print sheets in the cartridge 118, which wi 11 then be returned in its entirety to the inside of the casing 134 whenever being used. There is thus an advantage that the total space in which the constituent elements of the apparatus is included is reduced.

Figure 12:
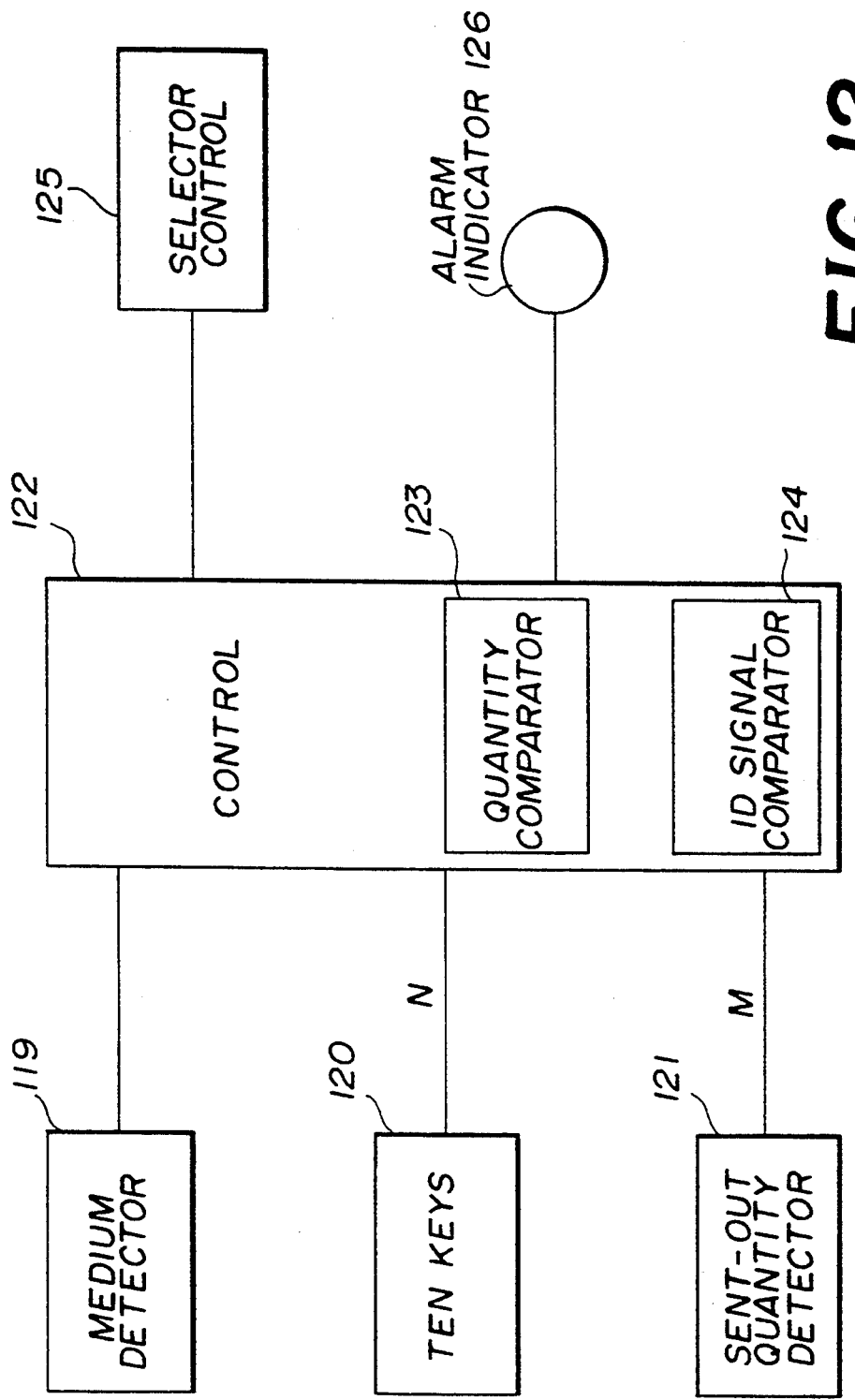
FIG. 12 is a schematic circuit diagram including control electronics of a printing apparatus with a scanner according to still another illustrative embodiment of the invention.

In place of the sensor 109, any type of identification means for discriminating original sheets from print or recording sheets may be provided. Such means may comprise, for example, a sent-out quantity detector 121. FIG. 12, for detecting the number of medium sheets M sent out from the hopper 107, an input device 120 for entering the number of the original or print sheets N, to be processed, and a comparator 123 for comparing the number of medium sheets M detected by the sent-out quantity detector 121 with the number N received from the input device 120. In the identification means, the number of original or print sheets stored in the hopper section 107 is inputted from the input device 120 in advance. It is so interpreted that the original or print sheets are sent out until the comparator 123 indicates a coincidence of the number of the media M detected by the sent-out quantity detector 121 with the number N set by the input device 120, and after a coincidence occurring, it is so interpreted that the print or original sheets have been processed. This permits a conventional paper feed tray without separator 108 t o be used for the hopper section 107.

Figure 13:
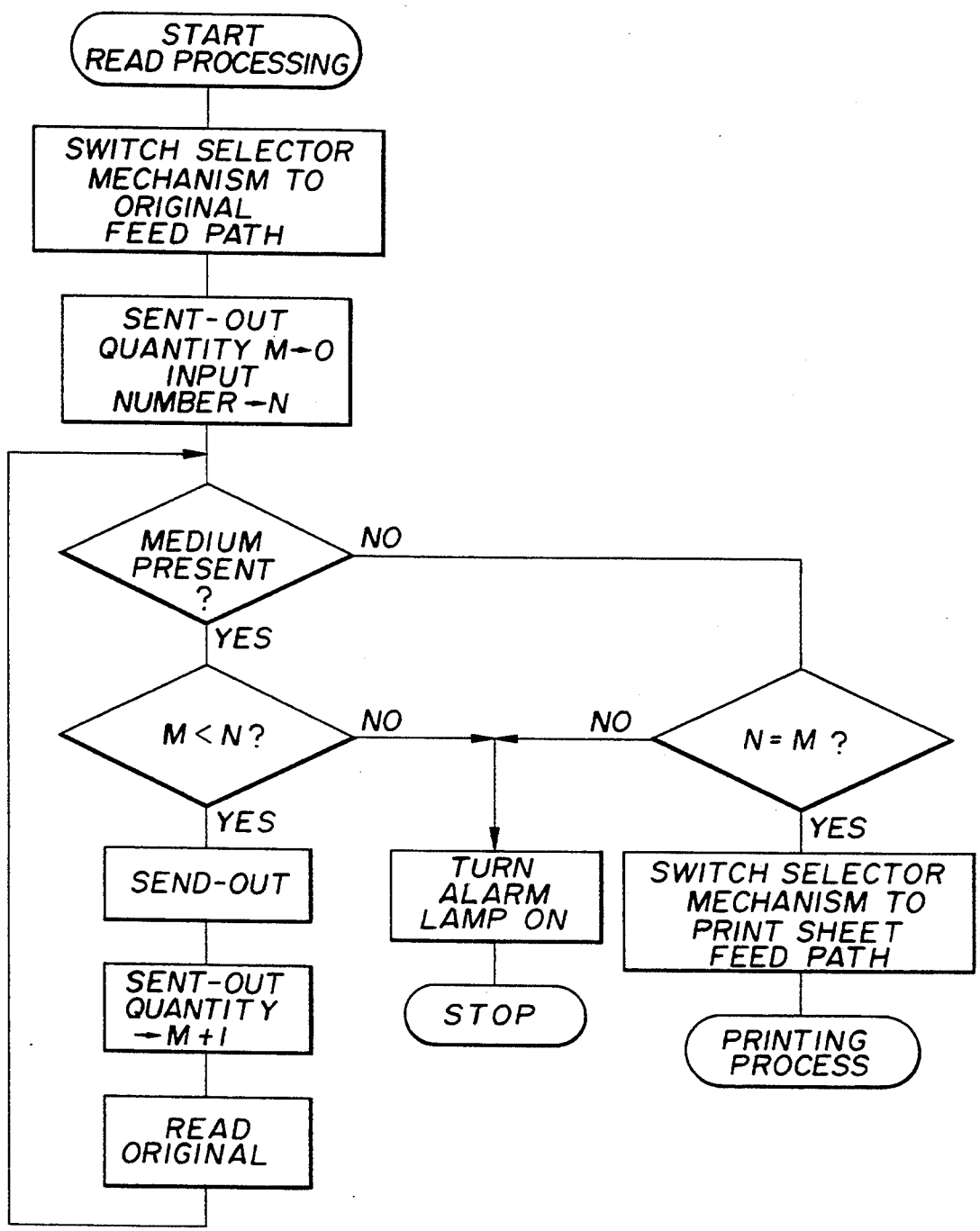
FIG. 13 is a flow chart useful for understanding operations of the control circuit shown in FIG. 12.

Further, the printing apparatus may be adapted to be controllable by the the circuit structure specifically shown FIG. 12 in response to the sequences represented by a flow chart of FIG. 13. With that apparatus, it is possible to use the identification means shared by the separator 108 and the input device 120 for entering the number of sheets N to be handled. More in detail, the circuit shown in FIG. 12 comprises a medium detector 119 for detecting whether or not a medium or media are on the separator 108, ten keys or key pad 120 for entering a number, such as the number of sheets N to be processed, and a sent-out quantity detector 121 for detecting the number of medium sheets M sent out from the hopper section 107 or which reached the read section of the apparatus.

The circuitry includes a control circuit 122 which is operative for generally controlling the constituent elements of the apparatus in response to the program sequences such as shown in FIG. 13. As depicted in the figure, the control circuit 122 includes a quantity comparator unit 123 for comparing the number of medium sheets M detected by the sent-out quantity detector 121 with the number N entered from the input device, and an identification (ID) signal comparator, unit 124 for comparing a signal from the medium detector 119 with a signal from quantity comparator unit 123. The circuitry also includes selector control circuit 125 for operating the selector mechanism 112, and an alarm indicator 126, which may be a lamp or a buzzer and is enabled in repsonse to the detector or identification signal comparator 124 having detected an abnormality in comparison, which will be described in detail below.

In the apparatus, the media are sent out one by one for reading, if they are present in the hopper 107 and the number of dedium sheets M captured into the apparatus is smaller than the input number N. However, if the number of medium sheets sent out M becomes equal to the input number N, though media remain on the separator 108 possibly due to the fact that more than one medium sheets was fed at the same time or the number of medium sheets to be handled N has erroneously been set from input device 120, then the alarm indicator 126 is turned on and the apparatus is stopped.

When there is no medium in the hopper 107, it is checked to determine whether the number of medium sheets M sent out is equal to the input number of medium sheets N. As a result, if they are equal to each other, it is so interpreted that all the original sheets are normally read in, and the selector mechanism 112 is switched to open the path through which print sheets are to be fed and go to a printing processing. Otherwise, namely, if they are not equal to each other by reasons such that there occurs a double feeding of the sheets or an erroneous entry of the number of sheets to be processed, the main control 122 enables the alarm indicator 126 to be turned on and stops the apparatus.

Thus, the printing apparatus with a scanner comprises a separator provided on the hopper section, first identification means comprising the medium detector for detecting a presence/absence of medium or media on the separator, a sent-out quantity detector for detecting a quantity of the medium sent out from the hopper, input means for entering the sent-out quantity of the original sheets or the print sheets, second identification means comprising quantity comparison means for comparing the quantity of the media detected by the sent-out quantity detector with the number of sheets to be sent-out entered from the input means, and identification signal comparison means for comparing a signal from the first identification means with a signal from the second identification means. According to such arrangement of apparatus, when there is unexpectedly no original or print sheet due to double feeding, for instance, only the first identification means outputs an identification signal. Thus, it is possible to alarm an operator, and also to stop the operation of reading or writing, when there is occurrence of double feeding or a jam of the medium, or errors of operation in entry.

Further, it may be so arranged that the medium sent out from the hopper section is read by a simple optical sensor, wherein when the medium is of almost or substantially uniformly blank paper in its entirety, it is identified as the print sheet, and when there is an optical density sensed in reading the medium to some extent, the medium is identified as the original.

Now, it should be noted that the embodiment described above is applicable to the electrophotographic printing apparatus, the present invention is applicable also to other types of printing apparatus such as a wire dot or stylus printer and a thermal printer.

According to the invention as described above in respect of time illustrative embodiment, it is possible to expect the following advantages:

Since it is identified by the identification means whether time medium is an original or a print sheet, it is possible to alarm an operator in accordance with a result from identification and also to control operation of time apparatus. Thus, even when an original and a print sheet are simultaneously accommodated in a paper feed section, it is possible to avoid such useless operation that printing is erroneously carried out on time original, or a blank paper of print sheet is read.

Since it is identified by the identification means whether the medium is an original or a print sheet, and a feeding path for the medium is switched in response to a result from the identification, it is possible to properly feed the original sheet and the print sheet to a reader section and a writing section, respectively, even with time printing apparatus adapted to feed them from a single hopper section for the medium.

Since the hopper section is provided with a separator, and it is so interpreted that, if there is a medium on the separator, then for instance an original sheet remains and time medium to be sent out is identified as the original document, it is sufficient that a medium to be additionally loaded is simply accommodated on the separator. Thus, the loading of the medium is simplified.

While the present invention has been described with reference to the particular illustrative embodiments, it is not to be restricted by those embodiments but only to the appended claims. It is to be appreciated that those skilled in the art can change or modify the embodiments without departing from the scope and spirit of the present invention.

What is claimed is:

1. In an electrophotographic recording apparatus having an array of light emitting devices for emitting an exposure light to expose a photoconductor with the exposure light to form a latent image thereon, a developer assembl for developing the latent image to a toner image, a transfer assembly for transferring the toner image to a recording sheet, and a fuser assembly for fixing the toner image transferred on the recording sheet, the combination comprising:

a light emitting and light intercepting head having a single unitary body, said head including said array of light emitting devices and an array of photosensitive devices arranged adjacent to said array of light emitting devices to receive part of the exposure light; and an original feed mechanism for feeding an original document sheet to a first path formed between said light emitting and light intercepting head and said photoconductor, said array of photosensitive devices receiving part of the exposure light reflected from the original document sheet conducted on the first path to read an image carried on the original document sheet.

2. An apparatus according to claim 1, further comprising optical lens means provided between said light emitting and intercepting head and said photoconductor for conducting the exposure light to said photoconductor and the part of the exposure light reflected on the original document sheet to said array of photosensitive devices.

3. An apparatus according to claim wherein said optical lens means comprises an array of rod lenses.

4. An apparatus according to claim 1, further comprising a common medium supply unit for supplying media such as an original document sheet and a recording sheet, and a separator mechanism for separating the media with respect to whether the media are to be fed to the first path or a second path formed between said transfer assembly and said photoconductor.

5. An apparatus according to claim 1, further comprising an upper tray for receiving media such as an original document sheet and a recording sheet discharged after recorded or read so as to permit the media to be taken out from a front of said apparatus.

6. An apparatus according to claim 1, wherein light emitting devices of said array of light emitting devices and photosensitive devices of said array of photosensitive devices are disposed alternately with each other:

said light emitting and intercepting head further comprising a light emitting device driver carried on said unitary body for driving said light emitting devices, and a read circuit carried on said unitary body for reading outputs of said photosensitive devices.

7. An apparatus according to claim 1, wherein said array of light emitting devices and said array of photosensitive devices are formed on a single chip into one and another lines, respectively.

8. An apparatus according to claim 6, wherein said arrays of light emitting and photosensitive devices comprise light emitting diodes and photosensitive diodes, respectively, and said light emitting diodes are disposed alternately with said photosensitive diodes.

9. In an electrophotographic recording apparatus comprising an array of light emitting devices adapted to be operative in response to an imagewise signal for emitting light to optically write an image represented by the signal on a photoconductor, read means for reading an original document sheet, and a light source for illuminating the original document sheet, the combination comprising:

a light emitting and intercepting head comprising an array of photosensitive devices, said array of photosensitive devices being arranged as said read means adjacent said array of light emitting devices for receiving light reflected from the original document sheet;

a converging lens for converging the light emitted from said array of light emitting devices and light to be incident upon said array of photosensitive devices; and an original transfer mechanism for feeding original document sheet to a path formed between said converging lens and said photoconductor.

10. An apparatus according to claim 9, further comprising an upper tray for receiving media such as an original document sheet and a recording sheet discharged after recorded or read so as to permit the media to be taken out from a front of said apparatus.

11. In an electrophotographic recording apparatus comprising an array of light emitting devices adapted to be operative in response to an imagewise signal for emitting light to optically write an image represented by the signal on a photoconductor, and read means for reading an original document sheet, the combination comprising:

a light emitting and intercepting head comprising an array of photosensitive devices, said array of photosensitive devices being arranged as said read means adjacent said array of light emitting devices for receiving light reflected from the original document sheet;

a converging lens for converging the light emitted from said array of light emitting devices and light to be incident upon said array of photosensitive devices; and an original transfer mechanism for feeding the original document sheet to a path formed between said converging lens and said photoconductor, said array of light emitting devices being adapted to illuminate the original document sheet fed to the path.

12. In an electrophotographic recording apparatus comprising an array of light emitting devices adapted to be operative in response to an imagewise signal for emitting light to optically write an image represented by the signal on a photoconductor, a transfer assembly for transferring the image written on said photoconductor to a recording sheet, read means for reading an original document sheet, and a light source for illuminating the original document sheet, the combination comprising:

a light emitting and intercepting head comprising an array of photosensitive devices, said array of photosensitive devices being arranged as said read means adjacent said array of light emitting devices for receiving light reflected from the original document sheet;

a common medium supply unit for supplying media such as an original document sheet and a recording sheet; and a separator mechanism for separating the media with respect to whether the media are fed to a first path formed between said light emitting and intercepting head and said photoconductor or a second path formed between said transfer assembly and said photoconductor.

13. An apparatus according to claim 12, further comprising an upper tray for receiving media such as the original document sheet and the recording sheet discharged after recorded or read so as to permit the media to be taken out from a front of said apparatus.

14. An electrophotographic recording apparatus comprising:

an array of light emitting devices adapted to be operative in response to an imagewise signal for emitting light to optically write an image represented by the signal on a photoconductor;

a light source for emitting an illumination light onto an original document sheet;

sensor devices for sensing part of the illumination light reflected from the original document sheet to read the original document sheet;

an original transfer mechanism for feeding the original document sheet to a path formed between said array of light emitting devices and sensor devices and said photoconductor; and an optical shutter disposed between said light source and said photoconductor for preventing the illumination light from irradiating said photoconductor while the original document sheet is fed to the path.

15. An apparatus according to claim 14, further comprising an upper tray for receiving media such as the original document sheet and the recording sheet discharged after recorded or read so as to permit the media to be taken out from a front of said apparatus.

16. A printing apparatus comprising:

a scanner unit for reading an original document sheet;

a printer unit for printing on a print sheet;

hopper means for accommodating the original document sheet and the print sheet; and determining means for determining whether a medium sent from said hopper means is an original document sheet or a print sheet.

17. An apparatus according to claim 16, further comprising a selector mechanism for selecting a feed path on which the medium is to be fed in accordance with a result from said determining means.

18. An apparatus according to claim 16, wherein said determining means comprises:

a separator provided on said hopper means: and a medium detector for detecting whether or not the medium is on said separator.

19. An apparatus according to claim 17, wherein said determining means comprises:

a separator provided on said hopper means; and a medium detector for detecting whether or not the medium is on said separator.

20. An apparatus according to claim 16, wherein said determining means comprises:

a sent-out quantity detector for detecting a first number of media sent out from said hopper means;

input means for entering a second number of original document sheets or print sheets to be sent out; and comparison means for comparing the first and second numbers to produce an indication of a coincidence occurring between the first and second numbers.

21. An apparatus according to claim 17, wherein said determining means comprises:

a sent-out quantity detector for detecting a first number of media sent out from said hopper means:

input means for entering a second number of original document sheets or print sheets to be sent out; and comparison means for comparing the first and second numbers to produce an indication of a coincidence occurring between the first and second numbers.

22. An apparatus according to claim 16, further comprising an upper tray for receiving media such as an original document sheet and a print sheet discharged after printed or read so as to permit the media to be taken out from a front of said apparatus.

23. An apparatus according to claim 16, wherein said apparatus is an electrophotographic recording apparatus.

24. A printing apparatus comprising:

a scanner unit for reading an original document sheet:

a printer unit for printing on a print sheet:

a hopper section for accommodating therein media such as the original document sheet and the print sheet;

first identification means comprising a separator provided on said hopper section, and a medium detector for detecting whether or not the medium is on said separator;

second identification means comprising a sent-out quantity detector for detecting a first number of media sent out from said hopper section, input means for entering a second number of original document sheets or print sheets to be sent out, and comparison means for comparing the first and second numbers; and identification signal comparison means for comparing a signal from said first identification means with a signal from said second identification means to produce an indication of alarm in response to results from comparison.

25. An apparatus according to claim 24, further comprising an upper tray for receiving media such as an original document sheet and a print sheet discharged after printed or read so as to permit the media to be taken out from a front of said apparatus.

26. An apparatus according to claim 24, wherein said apparatus is an electrophotographic recording apparatus.

* * * * *